United States Patent [19]

Stephan et al.

[11] Patent Number: 4,867,499
[45] Date of Patent: Sep. 19, 1989

[54] LOUVERED TAILGATE AND AIRFLOW DIRECTING WING FOR PICKUP TRUCK

[75] Inventors: Donald C. Stephan, Carson City, Nev.; Timothy M. Sharp, Rancho, Calif.; Gary A. Yeomans, Bloomfield Hills, Mich.; James R. Abney; Ben V. Domas, both of Lake Orion, Mich.

[73] Assignee: Mantex Corporation, Oxford, Mich.

[21] Appl. No.: 182,883

[22] Filed: Apr. 18, 1988

[51] Int. Cl.4 ............................................. B62D 25/00
[52] U.S. Cl. .................................... 296/50; 296/180.1
[58] Field of Search ............... 296/180.1, 180.2, 180.3, 296/180.5, 57 R, 52, 59, 50; 49/74, 75, 82, 84

[56] References Cited

U.S. PATENT DOCUMENTS

| | | | |
|---|---|---|---|
| 1,235,361 | 7/1917 | Monthei | 296/52 X |
| 2,994,556 | 8/1961 | Sewelin et al. | 296/57.1 |
| 3,929,369 | 12/1975 | Blair | 296/180.3 |
| 4,159,843 | 7/1979 | Crossman | 296/180.1 |
| 4,165,118 | 8/1979 | Jensen | 296/50 |
| 4,201,411 | 5/1980 | Morgan | 296/50 |
| 4,318,565 | 3/1982 | Lay | 296/180.1 |
| 4,435,920 | 3/1984 | Osaka et al. | 49/82 |
| 4,475,759 | 10/1984 | Wine | 296/180.5 |
| 4,630,399 | 12/1986 | Okumoto | 49/74 X |
| 4,660,879 | 4/1987 | Kobayashi et al. | 296/180.5 |
| 4,674,788 | 6/1987 | Ohmura et al. | 296/180.5 |
| 4,688,351 | 8/1987 | Torres | 49/74 |
| 4,707,014 | 11/1987 | Rich | 296/180.1 |

FOREIGN PATENT DOCUMENTS

| | | | |
|---|---|---|---|
| 0551890 | 4/1923 | France | 49/82 |
| 2001953 | 2/1969 | France | 49/82 |
| 2237462 | 2/1974 | France | 296/180.5 |
| 2017023 | 9/1979 | United Kingdom | 296/180.1 |

Primary Examiner—Robert B. Reeves
Assistant Examiner—Joseph D. Pape
Attorney, Agent, or Firm—Basile and Hanlon

[57] ABSTRACT

A tailgate for a pickup truck includes three elongate, rectangular panels or louvers having an airfoil-shaped cross section pivotally mounted in a U-shaped tailgate frame conformed to be mounted on a pickup truck in place of the conventional tailgate. The louvers are linked to each other for coordinated pivotal movement about respective horizontal axes extending along the leading edge of the airfoil section between a closed position and an open position wherein the louvers project rearwardly from the frame to accommodate a substantially unrestricted flow of air through the tailgate. A reversible electric motor controlled from the cab drives the louvers in pivotal movement through a worm gear drive which will hold the louvers at any selected position. An airfoil section wing is mounted at the rearward end of the truck cab in spaced relationship to the cab roof and sidewalls to reduce turbulence in air flowing toward the tailgate.

9 Claims, 3 Drawing Sheets 4,867,499

LOUVERED TAILGATE AND AIRFLOW DIRECTING WING FOR PICKUP TRUCK

BACKGROUND OF THE INVENTION

I. Field of the Invention

The present invention relates to a drag-reducing wing and tailgate for pickup trucks.

II. Description of the Prior Art

The prior art has recognized that the tailgate of a pickup truck, when in a closed position, creates a substantial barrier to airflow which adversely affects gas mileage. Prior art patents, such as Jensen Patent 4,165,118; Morgan 4,201,411; and Wine Patent 4,475,759 disclose tailgates in which one or more elongate, rectangular panels or louvers are pivotally mounted within a tailgate frame for movement between a closed position where the major surface of the panel lies in a generally vertical position, and an open position wherein the panel is pivoted in the tailgate frame to lie in a generally horizontal position so that the panel is disposed in an edgewise relationship to the rearward flow of air relative to the truck to present a minimal resistance to this airflow. Morgan and Wine disclose various arrangements by means of which the panels may be mechanically latched in their closed position or be mechanically latched in one or more open or partially open positions. The Jensen patent discloses an arrangement in which a plurality of panels may be latched in a closed position or unlatched to pivot freely in response to the rearward flow of air against the panels to open positions to minimize resistance to this flow of air through the tailgate.

The Wine patent identified above further discloses an arrangement by which a pivoted tailgate panel may be locked in a downwardly and forwardly inclined position to induce a downwardly directed force on the rearward end of the truck derived from the airflow against the inclined panel surface which will increase the traction for rear-wheel drive trucks.

While the various tailgates shown in the patents referred to above all provide a substantially reduced resistance to airflow as compared to a conventional solid tailgate, those arrangements which will locate the various panels in fixed open positions require the panel to be manually moved to and manually latched in the desired position. Where the panels may pivot freely, as in Jensen 4,165,118, turbulence in the airflow induced by airflow around the cab of the truck will tend to cause a substantial amount of flutter of the freely pivotal panels which, under certain conditions, can become quite violent.

The present invention is directed to a solution of the foregoing problems, and further to the reduction of turbulence in the flow of air rearwardly toward the tailgate.

SUMMARY OF THE INVENTION

In accordance with the present invention, a tailgate frame is constructed in an open-top, generally U-shaped configuration conformed to fit within tailgate receiving recesses built into the sidewalls and floor of a pickup truck bed at the rearward end of the bed. Three elongate, rectangular louvers having a airfoil-shaped, transverse cross section extend horizontally between the upright side frame members of the U-shaped frame. The louvers are pivotally mounted in the side frame members for pivotal movement about rigid rods, the opposite ends of the rods being fixedly attached to the side frame members to assist in rigidifying the frame. The rods define respective horizontal axes which extend along the leading edge of the airfoil-shaped transverse cross section of the louvers. Each louver is provided with a crank arm which projects radially from its axis, and the crank arms are pivotally interconnected to a common link which coordinates the pivotal movement of the louvers in the tailgate frame. A worm wheel sector is fixedly mounted upon one louver in coaxial relationship to the pivotal axis of the louver and is meshed with a worm driven by a reversible, electric drive motor which may be controlled from the truck cab. The louvers may be positioned by the motor in a closed position in which the louvers lie in a generally vertical position in a vertically overlapping relationship which cooperatively presents a continuous surface completing closing the opening in the U-shaped tailgate frame. The motor may be actuated to drive the louvers to an open position in which the louvers project rearwardly from the tailgate frame to be disposed substantially edgewise to rearward flow of air through the truck bed. When in their open position, the convex side of the airfoil-shaped cross section of the louvers faces downwardly so that the reduced pressure induced by the flow of air past the louvers creates a downward force - the reverse of the lift generated on a airplane wing - producing a downward loading on the rearward end of the truck bed to increase traction. Preferably, the crank arms on the louvers are so dimensioned as to produce different angles of inclinations of the louvers relative to their axes when in the fully deployed, open position.

To reduce turbulence in the flow of air past the truck cab toward the louvers, an airflow-directing wing, again of an airfoil-type, transverse cross section, is mounted upon the truck cab to project rearwardly beyond the rearward side of the cab. When viewed lengthwise of the truck, this flow-directing wing is formed in an inverted, generally U-shaped configuration spaced outwardly from the roof and sides of the cab. The wing directs the rearwardly flowing air into paths parallel to the truck centerline to resist the tendency of the air to flow downwardly and inwardly into the region of reduced pressure at the rear of the truck cab. This in turn substantially reduces the turbulence in air moving toward the tailgate.

Other objects and features of the invention will become apparent by reference to the following specification and to the drawings.

DESCRIPTION OF THE PREFERRED EMBODIMENT

Figure 1:
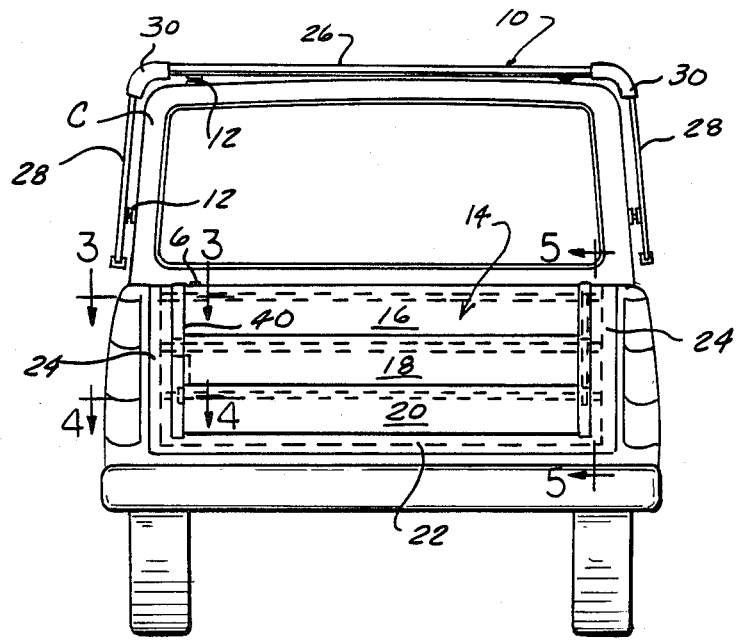
FIG. 1 is a rear elevational view of a pickup truck having a flow-directing wing and tailgate assembly embodying the present invention.

In FIG. 1 there is shown a rear view of a pickup truck having an airflow-directing wing designated generally 10 in accordance with the present invention mounted upon the truck cab C as by support members 12. A louvered tailgate assembly designated generally 14 is mounted at the rearward end of the truck bed in place of the conventional truck tailgate. Tailgate 14 includes an upper louver 16, an intermediate louver 18 and a lower louver 20, all mounted for pivotal movement, in a manner to be described in more detail below, within a tailgate frame which includes a bottom rail 22 rigidly connected at its opposite ends to upright side frame members 24.

Figure 2:
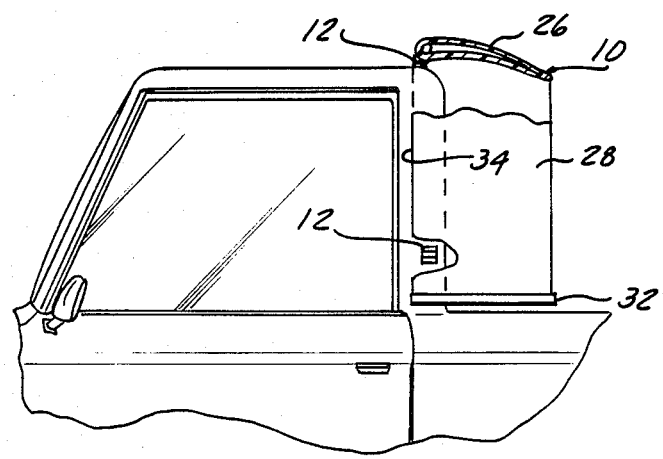
FIG. 2 is a side elevational view, with certain parts broken away or shown in section, of the cab portion of the pickup truck and wing of FIG. 1.

As best seen in FIG. 2, the flow-directing wing 10 is of an airfoil-shaped, transverse cross section and is mounted at the extreme rearward end of the truck cab C to project rearwardly beyond the rearward end of the cab.

As best seen in the rear view of FIG. 1, the wing extends transversely entirely across the top of the cab and then downwardly along the opposite sides of the cab to approximately the top edge of the truck bed sidewalls. The wing is spaced by mounting supports 12 clear of the top and side surfaces of the truck cab.

The wing 10 preferably is constructed with three separate sections - a top section 26 and two side sections 28 - which are interconnected with each other by hollow corner caps 30 conformed to receive the ends of members 26 and 28. Members 26 and 28 are of the airfoil-shaped cross section shown for member 26 in FIG. 2 and, preferably for manufacturing convenience, are of the same cross-sectional shape and dimensions as the tailgate louvers 16, 18 and 20 which will be described in more detail below. Preferably, the louvers and wing sections are formed of a thermoplastic material by passing the material through an extrusion die and cutting the extruded sections to length. The ends of sections 26 and 28 may be conveniently bonded or riveted in position within corner caps 30 and preferably the lower ends of side sections 28 are closed by end caps 32 or by plugs which likewise may be bonded into place.

As best seen in FIG. 2, the wing 10 is supported from the extreme rearward portion of the cab so that its leading edge 34 provides clearance for opening of the doors of the cab. The wing extends rearwardly well beyond the rear of the cab. The wing functions to direct air flowing rearwardly past the cab toward flow paths extending generally parallel to the path of movement of the truck. The vertical rear surface of the truck cab normally creates a region of low pressure rearwardly of the cab during forward movement of the truck, and air flowing rearwardly past the cab moves rapidly into this region of low pressure and produces a substantial degree of turbulence. The wing of the present invention modifies this flow pattern. Air which flows between the cab and the wing will follow the normal flow path just described; however, air flowing along the outer and upper sides of the wing is directed to paths more parallel to the longitudinal centerline of the truck which do not converge as rapidly or as close to the rearward side of the cab as the normal flow path. The wing substantially reduces the amount of turbulence in air flowing against the forward side of the tailgate, thereby enhancing the functioning of the louvered tailgate 14.

Figure 6:
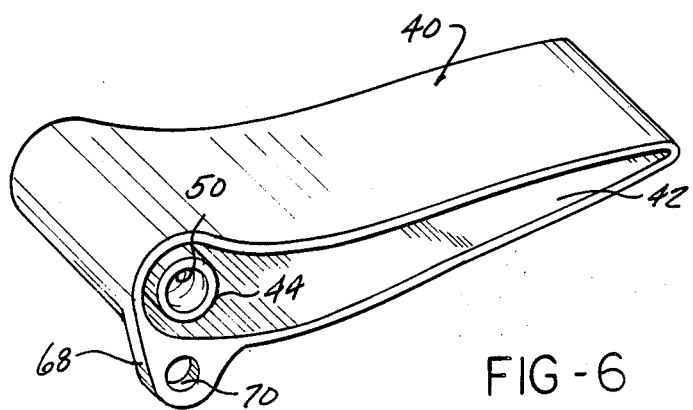
FIG. 6 is a perspective view, with certain parts broken away or shown in section, of an end cap.

With the exception of a modification to lower louver 20, which will be described in more detail below, louvers 16, 18 and 20 are of similar construction. The louvers are each formed with a preferably hollow, airfoil-shaped cross-sectional configuration, as described above, and have their opposite ends closed by end caps 40, an end cap 40 being shown in perspective view in FIG. 6. Each end cap 40 is formed of an airfoil-shaped section conformed to that of the louvers but of slightly larger dimensions so that an end of a louver may be inserted into the complementary recess 42 (FIG. 6) formed on the inner side of the end cap. The end cap is formed of a suitable thermoplastic material with a hollow tubular projection 44 integral with and projecting inwardly from the inner surface 46 of the outer wall portion of end cap 40. Projection 44 is spaced inwardly from the sidewall of end cap 40 so that the leading edge portion of the louver can snugly fit between projection 44 and the adjacent wall of end cap 40. End caps 40 are made in right and left-hand configurations to fit the opposite ends of the louvers and are fixedly secured in position upon the louver ends.

Figure 3:
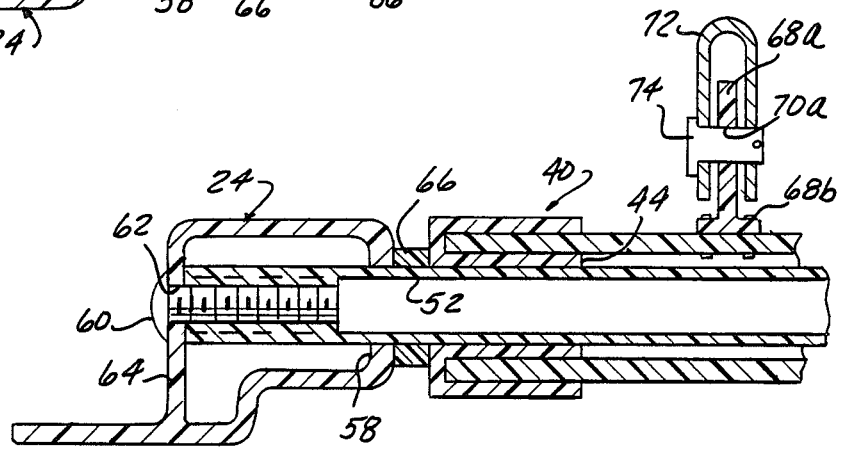
FIG. 3 is a cross-sectional view taken on the line 3—3 of FIG. 1.
Figure 7:
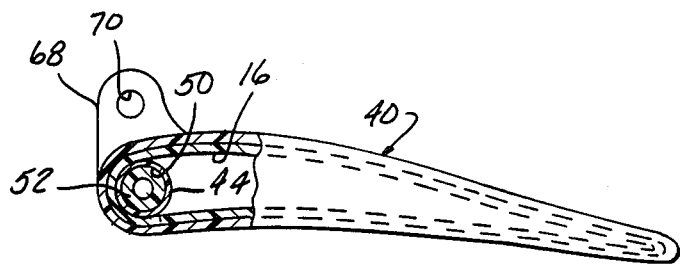
FIG. 7 is an end elevation of an assembled louver, with certain parts broken away and shown in section.
Figure 8:
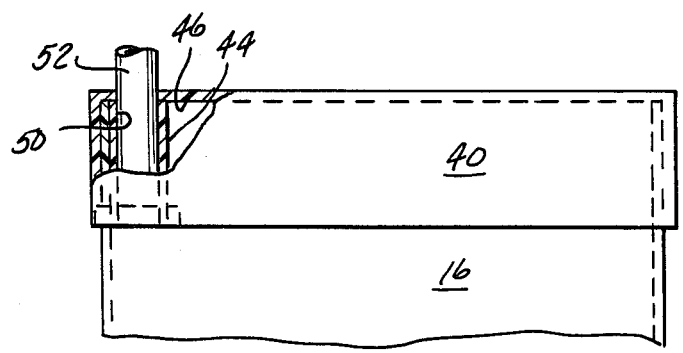
FIG. 8 is a top plan view of the end portion of a louver, with certain parts broken away and shown in section.

As best seen in FIGS. 3 and 8, the central bore 50 in projection 44 extends entirely through the end cap to rotatably receive a rigid rod 52 whose opposite ends are fixedly secured to side frame members 24 as best seen in FIGS. 7 and 8. Each rod 52 is internally threaded at each end as at 54. The rods pass through a bore 56 in the inner sidewall 58 of frame member 24 and are fixedly clamped within the sidewall by a bolt 60 which passes through a bore 62 in the outer sidewall 64 of side frame member 24. Spaces 66 are preferably loosely mounted on rods 52 between end cap 40 and side frame member 24 (FIG. 3).

Figure 5:
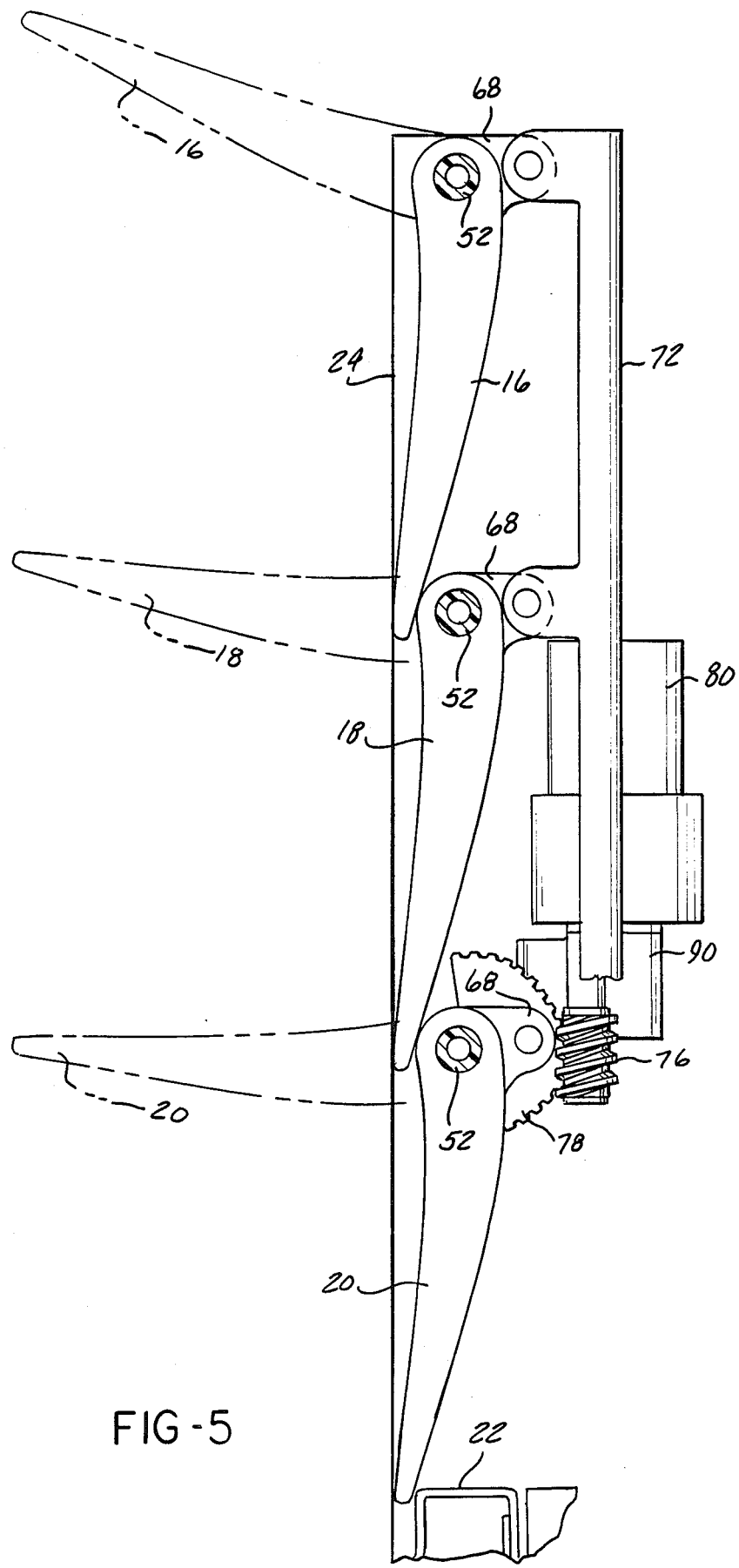
FIG. 5 is a detail cross-sectional view taken on the line 5—5 of FIG. 1.

Referring now particularly to FIG. 5, louvers 16, 18 and 20 are shown in solid line in FIG. 5 in their closed position. Each of louvers 16, 18 and 20 is supported by pivot rods 52 described above for pivotal movement relative to side frame members 24 about a horizontal axis which is closely adjacent the leading (upper as viewed in FIG. 5) edge of its airfoil-shaped cross section. Each of end caps 40 carries a crank arm 68 which preferably is formed integrally with the end cap. The crank arms 68 project radially from the pivot axis and are formed, near their distal ends, with pivot pin receiving bores 70. Where it is inconvenient to form the crank arms 68 integrally with the end caps 40, the arms may be formed independently as at 68a (FIG. 3) and fixedly attached, as by blind rivets 68b, directly to the louver.

A rigid link 72 is pivotally connected to each of the crank arms 68 at one side of the tailgate assembly as by pivot pins 74 which pass through the bores 70 in the respective crank arms (FIG. 3). A link 72 may be employed at each end of the louvers. Louvers 16, 18 and 20 are thus linked to each other by the links 72 for coordinated pivotal movement about their respective axes.

The louvers are driven in pivotal movement by a worm 76 meshed with a worm wheel sector 78 mounted upon lower louver 20, the worm 76 being driven by a reversible electric drive motor 80. Motor 80 is supplied from the truck battery via a control switch located in the truck cab, the switch being selectively operable to energize the motor to drive the louvers upwardly and rearwardly from the solid line position shown in FIG. 3 to respective fully deployed positions indicated in broken line in FIG. 3 or to pivot the louvers in the opposite direction. The worm-worm wheel interconnection between the motor and louvers enables the louvers to be locked in any position within their range of movement.

Figure 4:
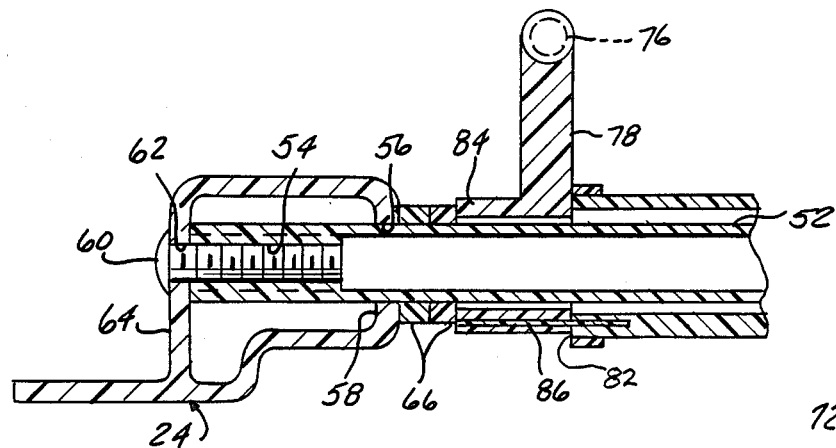
FIG. 4 is a detail cross-sectional view taken on the line 4—4 of FIG. 1.

In order to provide clearance for worm wheel sector 78, the construction of louver 20 is modified as best shown in FIG. 4. Referring to FIG. 4, the end cap 40 at one end of lower louver 20 and the louver itself are cut away as at 82 to form a recess in the leading edge of the louver. As best seen in FIG. 4, worm wheel sector 78 is formed with a hub portion 84 rotatively locked to louver 20 as by pins 86.

Motor 80 may be fixedly mounted upon side frame member 24 as by a mounting bracket 90 (FIG. 5).

Referring now to FIG. 5, the crank arms 68 on the end caps of louvers 16, 18 and 20 may preferably have the pivot receiving bores 70 in the crank arms located at different radial distances from the axis of pivotal movement of the respective louvers. Preferably, the effective crank arm radius of lower louver 20 is slightly greater than that of intermediate louver 18, which in turn is slightly greater than that of the crank on upper louver 16. With the foregoing relationship, when the louvers are in their fully deployed position indicated in broken line in FIG. 3, lower louver 20 will be in a substantially horizontal position, while intermediate louver 18 will be inclined slightly upwardly and rearwardly from its pivot axis and upper louver 16 will be inclined upwardly and rearwardly at a slightly greater inclination than that of intermediate louver 18. This arrangement enhances the flow characteristics of the tailgate when the louvers are in their open position - normally a greater volume of air will pass between louvers 16 and 18 than passes between louvers 18 and 20 or below louver 20. By progressively enlarging the spacing between the trailing edges of the louvers when in their open position, the resistance to flow between the louvers is reduced.

It will be noted that when the louvers are in their fully deployed position, the convex side of the airfoil-shaped cross section faces downwardly so that the "lift" induced by the flow of air past the airfoil section acts in a downward direction. This downward force induced by the inverted airfoil section substantially augments the downward force exerted by the airflow on the upwardly and rearwardly inclined louvers 16 and 18 to apply a downward loading on the rearward end of the truck bed to increase traction of the rear wheels.

It will be appreciated that the tailgate frame is conformed to be received within the recesses provided at the rearward ends of the sidewalls and bed of the truck which normally receive the originally factory installed tailgate. Preferably, the tailgate frame will be provided with hinge pins and latches so that the tailgate 14 may be opened and closed in the same manner as the normal tailgate. In that hinging and latching arrangements for tailgates differ between various truck manufacturers, such hinges and latches are not shown in the present application.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. A tailgate assembly for a pickup truck bed having tailgate receiving recesses in the sidewalls and floor of said bed at the rearward end of said bed, said assembly comprising a U-shaped frame defined by a horizontal bottom rail and side frame members fixedly secured to and projecting upwardly from the opposite ends of said bottom rail, said rail and side frame members being conformed to be received within said recesses in said floor and sidewalls of said bed when said frame is in an upright closed position relative to said bed, a plurality of elongate rigid pivot rods fixedly mounted at their opposite ends upon and extending between said side frame members in spaced parallel relationship to each other and said bottom rail, a plurality of elongate, rectangular louvers of an airfoil-shaped transverse cross section having a leading edge and a trailing edge extending horizontally between said side rails, said plurality of louvers being respectively mounted upon said plurality of pivot rods for pivotal movement about spaced, horizontal axes parallel to said bottom rail and extending generally along the leading edges of the respective louvers, a crank fixedly mounted on the leading edge of each of said louvers and projecting radially of the pivotal axis of the louver to a distal end, link means pivotally connected to the respective distal ends of said cranks to couple said louvers to each other for coordinated pivotal movement about their respective pivot axes between a closed position wherein said louvers lie in vertically overlapping relationship with each other with their respective leading edges uppermost and a fully deployed position wherein said louvers project rearwardly from said side frame members when said frame is in said upright closed position, the radial distance from the pivot axis of each louver to the pivotal connection between its crank and said link means progressively decreasing from the louver adjacent said bottom rail to the louver most remote from said bottom rail, and remote controlled means for driving said louvers between said closed and said fully deployed positions.

2. The invention defined in claim 1 wherein said remote controlled means comprises reversible motor means mounted on said frame, a worm driven by said motor means, and a worm wheel segment meshed with said worm and fixedly mounted on one of said louvers in coaxial relationship to the pivot axis of said one of said louvers.

3. In an airflow control means for a pickup truck having a cab, a bed extending rearwardly from said cab and a tailgate mounted at the rearward end of said bed, said airflow control means comprising a plurality of elongate, rectangular louvers mounted in and extending laterally substantially entirely across said tailgate, means mounting said louvers for coordinated pivotal movement about respective spaced parallel horizontal axes between a closed position wherein said louvers cooperatively present a continuous, substantially vertical surface extending entirely across said tailgate and a fully deployed position wherein said louvers extend rearwardly of said tailgate in vertically spaced relationship to each other to accommodate a substantially unrestricted flow of air through said tailgate between said louvers, the improvement wherein said louvers are of an airfoil-shaped, transverse cross section having a leading edge, a trailing edge and a convex surface extending between said leading and trailing edges, said mounting means mounting said louvers for rotation about respective pivot axes extending along said leading edge with the leading edge of each louver being located above its trailing edge when said louvers are in said closed position and the convex surfaces of said louvers facing downwardly when said louvers are in their fully deployed position.

4. The invention defined in claim 3 further comprising remote controlled means for driving said louvers between said closed and said fully deployed positions and for locating said louvers in any selected position between said closed and fully deployed positions.

5. The invention defined in claim 4 wherein said plurality of louvers comprises an upper louver having its pivot axis extending substantially along the top of said tailgate, an intermediate louver having its pivot axis spaced below that of said upper louver by a distance such that the trailing edge of said upper louver vertically overlaps the leading edge of said intermediate louver when said louvers are in their closed position, and a lower louver having its pivot axis spaced below that of said intermediate louver by a distance such that the trailing edge of said intermediate louver overlaps the leading edge of said lower louver when said louvers are in their closed position.

6. The invention defined in claim 5 wherein said mounting means is operable when said louvers are in their fully deployed position to incline said upper louver rearwardly and upwardly of its pivotal axis at an angle of inclination greater than the angle of rearward and upward inclination of said intermediate louver and to locate said lower louver in a substantially horizontal position.

7. The invention defined in claim 3 further comprising wing means mounted on the rearward portion of said cab for directing air pulling rearwardly past said cab toward said tailgate.

8. The invention defined in claim 7 wherein said wing means are fixedly mounted on said cab to project rearwardly beyond said cab, said wing means including an upper wing section spaced from and extending transversely across the top of said cab, and a pair of side sections extending downwardly from the opposite ends of said upper section in respective spaced relationship to the opposite sides of said cab.

9. The invention defined in claim 8 wherein said louvers and said upper and side sections of said wing means are of like airfoil-shaped transverse cross section.

* * * * *